RE 25036

Dec. 15, 1959         V. P. DONNER ET AL         2,917,125
                FLUID POWER STEERING SYSTEM

Filed April 19, 1957                    3 Sheets-Sheet 1

INVENTORS.
Verne P. Donner
William W. Renning
George S. Allen, Jr.

By Paul O. Pippel
                    Atty.

INVENTORS.
Verne P. Donner,
William W. Henning,
George S. Allin, Jr.
By Paul O. Pippel
Atty.

United States Patent Office 2,917,125
Patented Dec. 15, 1959

2,917,125

FLUID POWER STEERING SYSTEM

Verne Paul Donner, Palatine, William W. Henning, Hinsdale, and George S. Allin, Jr., Homewood, Ill., assignors to International Harvester Company, Chicago, Ill., a corporation of New Jersey Application April 19, 1957, Serial No. 653,802

5 Claims. (Cl. 180—79.2)

This invention relates to a fluid power steering system. More in particular this invention relates to a hydraulic power steering system for a two-wheel tractor pivotally connected to a trailer vehicle such as a road scraper.

Power steering mechanisms generally are provided with an independent source of fluid under pressure usually in the form of a low capacity fluid pump driven by the vehicle power plant. Under certain conditions particularly at low engine speeds, rapid angular, displacement of the tractor with respect to its trailer is impossible because of insufficiency of fluid delivery under pressure from the pump.

Most tractors of the two-wheel type are provided with a relatively large capacity fluid pump to serve utility purposes such as hydraulic rams for dumping a loaded trailer or controlling the ground engaging elements of a scraper. A prime object of this invention is a power steering system which provides rapid angular displacement of the tractor with respect to the trailer under all conditions of engine speed by supplementing fluid power from the steering pump with the utility pump thus making a much larger amount of fluid under pressure available for steering purposes.

Another important object of this invention is to provide a fluid power steering system having progressive steering characteristics whereby the angular displacement of the tractor with its trailer assumes a position corresponding to the position of the steering control wheel.

A further object of this invention is to provide a fluid power steering system whereby irregularities in road conditions are communicated to the steering control wheel so that the operator may have the benefit of "road feel" similar to that of driving an automobile.

A still further object of this invention is to provide a low magnitude force in opposing relation in the steering elements so that backlash of the mechanical connections of the various angular displacing steering components is always avoided.

These and other important objects inherent and encompassed by the invention will be more readily understood from the ensuing description, the appended claims, and the annexed drawings wherein:

Figure 4 is a side elevation in section taken through the longitudinal medial line of the fluid control valve according to this invention.

Figure 1:
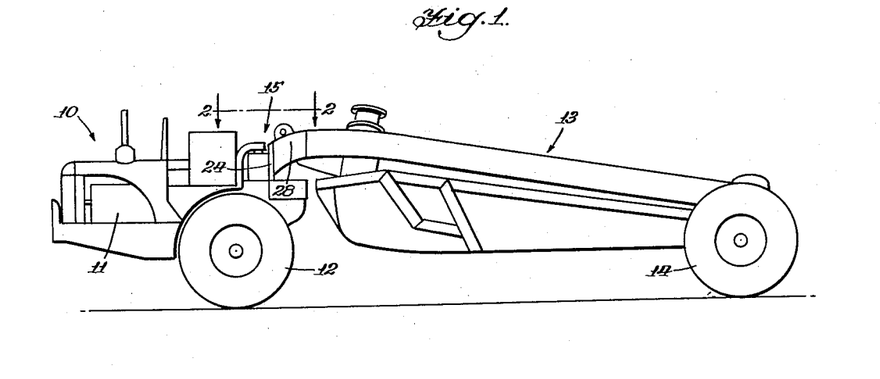
Figure 1 is a side elevation of a two-wheeled tractor and associated trailer illustrating a general environment on which this invention may be utilized.

Referring now to the drawings illustrating a preferred embodiment of the invention, it will be seen from Figure 1 that the numeral 10 generally indicates a two-wheeled tractor having a power plant or engine 11 supported by a pair of ground engaging traction wheels one of which is shown at 12. The numeral 13 generally indicates a trailer, such as a road scraper, supported on the rearward portion by a pair of ground engaging wheels one of which is shown at 14. The forward portion of the trailer 13 is pivotally connected to the rearward portion of the tractor 10 in a well known manner as generally indicated at 15.

Figure 2:
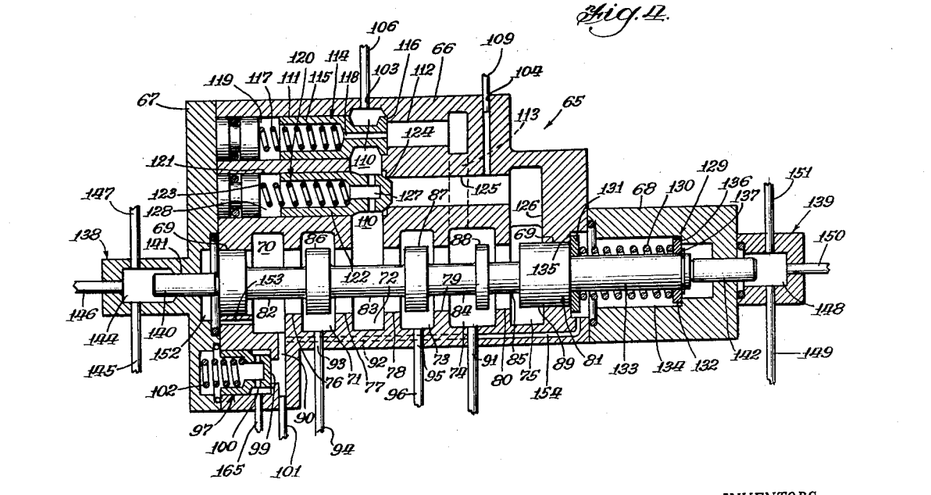
Figure 2 is a plan view, partly broken away, taken on line 2—2 of Figure 1 illustrating the general arrangement of a preferred form of the angular displacing elements for steering a two-wheeled tractor and trailer according to this invention.
Figure 3:
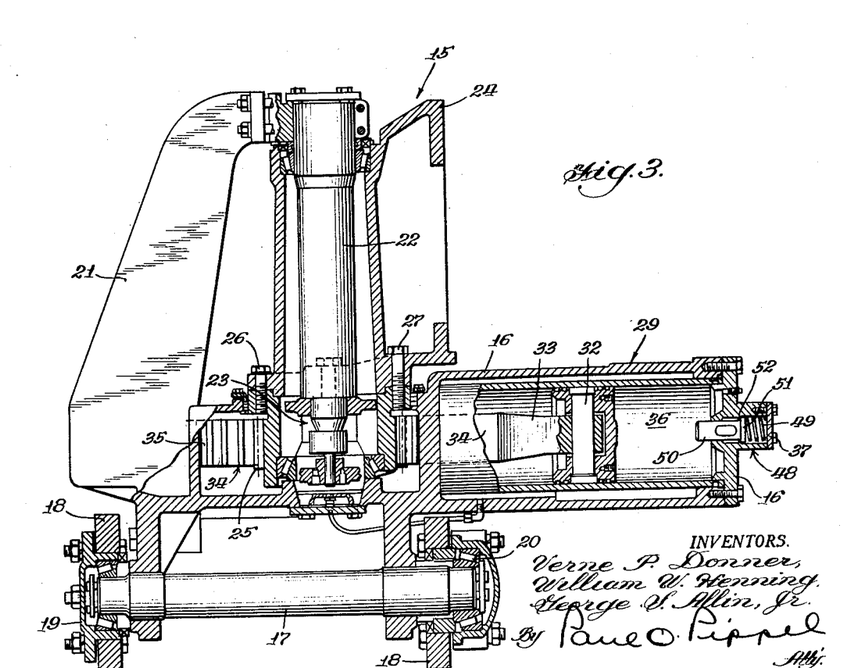
Figure 3 is a side elevation, partly in section and partly broken away, taken on line 3—3 of Figure 2, showing a detailed construction of the pivotal hitching mechanism of the tractor to the trailer including the power unit for effecting angular displacement of the tractor with respect to the trailer according to this invention.

Referring now to Figures 2 and 3, the portion of the pivotal connection 15 mounted on the rearward portion of the tractor 10 may comprise a housing or casing 16 pivotally mounted on a longitudinal shaft 17. The shaft 17 is journalled to the tractor frame 18 on the two axially disposed bearing assemblies 19 and 20. From this it can be seen that the casing 16 may rotate to a limited degree longitudinally with respect to the tractor 10 for purposes later explained.

The casing 16 also includes an upwardly extending yoke 21 which supports the upper end portion of a king pin 22. The lower portion of the king pin 22 is supported by the casing 16 as is generally indicated at 23 as best shown in Figure 3.

A carrier member 24 is pivotally mounted on the king pin 22 and connected rigidly to a large pinion gear 25 by a plurality of bolts two of which are shown at 26 and 27. A connecting element 28 (Figure 1) commonly referred to as a "goose-neck" of the forward portion of the trailer 13 is rigidly connected to the carrier member 24 by any suitable means such as bolts (not shown). Thus, the trailer 13 may pivot about the king pin 22 in substantially a vertical plane and forms a hitch between the trailer 13 and tractor 10. The shaft 17 permits longitudinal movement of the casing 16 and trailer 13 with respect to the tractor 10 so that deviations in road conditions do not impose unnecessary lateral strain on the king-pin 22 and its supporting elements.

The rearward portion of the casing 16 is provided with a fluid powered reversible motor generally indicated at 29. The reversible motor 29 may conveniently be comprised of a first single-acting ram 30 and a second single-acting ram 31 disposed in opposed parallel relation with respect to each other. The ram 30 is provided with a piston 32 and connecting rod 33. The rod 33 may be integrally or pivotally connected to a first rack member 34 having inwardly extending gear teeth 35 in engaging relation with the pinion gear 25 as best shown in Figure 2. Thus it may be seen that fluid under pressure entering the chamber 36 through the port 37 urges the piston 32 forwardly for moving the pinion gear 25 in a counterclockwise direction. It should be noted that a roller 38 is mounted on the casing 16 for vertical rotation and in engaging relation with the outer edge 39 of the rack member 34 so that the member 34 is maintained in meshed relation with the pinion gear 25 as best shown in Figure 2.

Similarly the ram 31 is provided with a piston 40 and connecting rod 41. The rod 41 may be integrally or pivotally connected to a second rack member 42 having inwardly extending gear teeth 43 in engaging relation with the pinion gear 25 as best shown in Figure 2. Again it may be seen that fluid under pressure entering the chamber 44 through the port 45 urges the piston 40 forwardly for moving the pinion gear 25 in a clockwise direction. It should again be noted that a roller 46 is mounted on the casing 16 for vertical rotation and in engaging relation with the outer edge 47 of the rack member 42 so that the member 42 is maintained in meshed relation with the pinion gear 25 as best shown in Figure 2.

Now it can be appreciated that when one of the rams 30 and 31 expands, the other correspondingly retracts. In order to prevent damage to a retracting ram due to the engagement of the rearward face of its piston with the rearward end portion of the casing 16, the ports 37 and 45 each are provided with a snubbing valve one of which is indicated at 48 in Figure 3. The snubbing valves serve to terminate the exhausting of fluid through the ports 37 and 45 when either of the pistons 32 or 40 are retracted to a predetermined limit. Although not a part of the present invention, the snubbing valve 48 may conveniently be comprised of a captive spring 49 positioned to urge forwardly a valve stem 50 to its limit formed by an enlarged portion 51 abutting a corresponding shoulder 52 formed in the casing 16. Retracting movement of the piston 32 causes the pressure side thereof to engage the valve stem 50 for further compression of the spring 49. Movement of the valve stem 50 rearwardly progressively closes or throttles the port 37 so that rearward movement of the piston 32 is dampened initially and ultimately stopped by confined fluid in the chamber 36 before abutting the rear end wall of the casing 16. The snubbing valve disposed in the port 45 is similar in construction to the snubbing valve in the port 37 above described.

For purposes later described, the power steering hitch mechanism referred to may be provided with a servo-pump. The servo-pump may conveniently be comprised of a left cylinder generally indicated at 53 and a right cylinder generally indicated at 54. Each of the cylinders 53 and 54 are constructed similar to relatively small single-acting hydraulic rams having their respective housings mounted rigidly on the casing 16. The cylinders 53 and 54 are positioned in diametrically opposed relation with respect to the vertical axis of the pinion gear 25 as best shown in Figure 2.

The left cylinder 53 of the servo-pump is provided with a reciprocable piston 55 connected to an externally protruding actuating pin 56. On the upper portion of the pinion gear 25 there is disposed a cam 57 constrained for rotation with the pinion gear 25. The cam surface 58 of the cam 57 is in alignment with and in abutting relation with the actuating pin 56 so that rotational movement of the cam 57 causes reciprocal movement of the pin 56 and piston 55 of the cylinder 53. The cam 57 may conveniently be circular in shape but positioned in eccentric relation with the pinion gear 25 and king-pin 22 as best shown in Figure 2. Thus, it can readily be seen that rotational movement of the pinion gear 25 and cam 57 causes movement of fluid in the chamber 59 and its connecting port 60. Similarly the right cylinder 54 of the servo-pump is provided with a reciprocable piston 61 connected to an externally protruding actuating pin 62 as shown in Figure 2. The pin 62 is also in alignment and in abutting relation with the cam surface 58 of the cam 57. Again it can be seen that rotational movement of the pinion gear 25 and cam 57 causes movement of fluid in the chamber 63 and its connecting port 64.

From the above it can be appreciated that when the pinion gear 25 and cam 57 associated with the trailer 13 is rotated with respect to the casing 16 associated with the tractor, fluid is exhausted through one of the ports 60 and 64 and fluid is entering through the other of the two ports 60 and 64.

The general construction of the hitch connection between the trailer 13 and tractor 10 and the power unit of the steering mechanism has now been described. At this point it is sufficient to say that in order to steer the tractor 10 and its associated trailer 13, it is necessary to create forcibly and controllably an angular displacement between the longitudinal axis of the tractor 10 with respect to the longitudinal axis of the trailer 13. Such angular displacement can be accomplished by energizing controllably one of the rams 30 or 31 appropriate to the direction desired.

One of the components employed to control the energizing of the rams 30 and 31 appropriately is a control valve generally indicated at 65 and is best illustrated in Figure 4. The control valve 65 may be comprised of a housing 66 including an end-wall 67 on one end thereof and a closure member 68 on the other end thereof. The casing 66 is provided with a longitudinally disposed bore 69. The housing 66 is provided with a first annular groove 70, a second annular groove 71, a third annular groove 72, a fourth annular groove 73, a fifth annular groove 74 and a sixth annular groove 75 in parallel arrangement concentric with the bore 69 as best shown in Figure 4. The annular grooves 70 through 75 form lands 76, 77, 78, 79 and 80 in the bore 69.

Disposed in slidable relation in the bore 69 is a movable valve member or plunger generally indicated at 81. The valve member 81 is provided with a first circumferential groove 82, a second circumferential groove 83, a third circumferential groove 84 and a fourth circumferential groove 85 in parallel relation. The circumferential grooves 82 through 85 form lands 86, 87, 88 and 89 as illustrated in Figure 4. The annular groove 70 is communicatively connected to a discharge port 90. Also the annular groove 74 is communicatively connected to the discharge port 90 through the port 91 and the laterally extending conduit 92 shown in dotted lines in Figure 4. The annular groove 71 is provided with a first fluid outlet port 93 connected to the conduit 94 which conduit 94 is communicatively connected with the port 37 of the first ram 30. The annular groove 73 is provided with a second fluid outlet port 95 connected to the conduit 96 which conduit 96 is communicatively connected with the port 45 of the second ram 31.

In the control valve 65 there is disposed a check valve generally indicated at 97 having its inlet side 99 in communication with the discharge port 90 and its outlet side 100 in communication with the conduit 165. The conduit 165 is communicatively connected to the internal portion of the casing 16 which may conveniently serve as a sump or reservoir 162 of the fluid return means. The check valve 97 is urged into closed position by a captive spring 102 selected so that fluid in the discharge port 90 is maintained at a predetermined low value, for example 25 p.s.i. Thus, when the fluid flow in the discharge port exceeds the predetermined low value, the check valve 97 opens to allow excess fluid to escape through the conduit 165 back to the sump or fluid reservoir 162.

Disposed on the upper portion of the control valve 65 is a primary inlet port 103 and a secondary inlet port 104. The port 103 is communicatively connected to a primary source of fluid under pressure such as a pump 105, shown schematically in Figure 5, by the conduit 106. A unidirectional flow valve, generally indicated at 107 (Figure 5) may be interposed in the conduit 106 to prevent reverse flow of fluid to the pump 105 should the pump 105 fail or fluid pressure in the conduit 106 exceed the pressure delivered by the pump 105. The secondary inlet port 104 is communicatively connected to a secondary source of fluid under pressure such as a pump 108, also shown schematically in Figure 5, by the conduit 109. It should be mentioned that the primary source of fluid under pressure 105 is of relatively small capacity but sufficient for steering under normal conditions. On the other hand, the secondary source of fluid under pressure 108 is of relatively large capacity and is basically intended for utility purposes such as operating lifting elements and the like. However, the invention contemplates the employment of both sources of fluid under pressure combinedly under certain steering conditions when the primary source is insufficient to meet emergency requirements and will be further discussed in the description of the operation of the invention.

Communicatively connecting the third annular groove 72 with the primary inlet port 103 of the control valve 65 is an elongated compartment 110. A bore 111 is disposed longitudinally in the housing 66 which intercepts the compartment 110. A bore 112 in axial alignment with and smaller than the bore 111 is disposed in the casing 66. The bore 112 is communicatively connected with the fifth annular groove 74 through the passage 113 shown in dotted lines in Figures 4 and 5. Within the bore 111 is a relief valve generally indicated at 114 having a slidable element 115 which seats on the shoulder 116 of the casing 66. A captive spring 117 urges the element 115 into seating arrangement with the shoulder 116. From this it can be seen that since the bore 111 is of larger diameter than the bore 112 a fluid pressure in the compartment 110 exceeding a predetermined maximum value will move the slidable element 115 leftwardly to further compress the spring 117 and consequently disengage the element 115 from seating relation with the shoulder 116 thereby permitting the excess fluid pressure to escape into the bore 112, passage 113 to the annular groove 74 which groove communicates with the discharge port 90 through the conduit 92 as previously explained. Now in order to prevent a chattering movement of the slidable element 115 of the relief valve 114, a small passage 118 is formed in the element 115 which communicatively connects the bore 112 with the spring chamber 119. Thus, lateral movement of the element 115 is dampened because fluid in the spring chamber 119 and the bore 112 must pass through the small passage 118 as a resulting consequence of any longitudinal movement of the element 115. From this it can be readily seen that by selecting appropriately the size of the passage 118 the movement of the element 115 can be dampened as may be required.

The control valve 65 is also provided with a second relief or check valve generally indicated at 120. In order to accommodate the relief valve 120, there is provided a bore 121 in the casing 66 which bore extends to the compartment 110. The valve 120 is comprised of a slidable element 122 urged by a captive spring 123 in a direction to seat against a shoulder 124 in the casing 66. Another bore 125 which may be of smaller diameter than the bore 121 is positioned in the casing 66 in axial alignment with the bore 121 and one end communicatively connected to the compartment 110 and the other end communicatively connected to the sixth annular groove 75 through the passage 126. It will also be observed from Figure 4 that the bore 125 is communicatively connected to the secondary inlet port 104. The slidable element 122 of the relief valve 120 is provided with a small passage 127 which communicates the spring chamber 128 with the compartment 110 as a breather. By selecting the size of the passage 127 appropriately will serve as a dampening means for preventing rapid movement of the slidable element thus avoiding chattering.

The general construction of the control valve 65 has now been described except the means for actuating movement of the movable valve member or plunger 81. It will be seen from Figure 4 that the rightward end portion of the control valve 65 is a centering device, indicated generally at 129, for urging the movable valve member 81 toward central or neutral position. The centering device 129 essentially consists of a captive spring 130 disposed between two annular collars 131 and 132. The collar 131 is in slidable relation with respect to the right end portion 133 of the valve plunger 81. The collar 131 is also slidable within the bore 134 of the closure member 68 as may be seen in Figure 4. However, the land 89 of the valve plunger 81 is engageable with the collar 131 for rightward movement in the bore 134. Leftward movement of the collar 131 is limited by the shoulder 135 in the housing 66. The collar 132 is disposed at the other end of the spring 130 in slidable relation with reference to the portion 133 of the valve plunger 81. Rightward movement of the collar 132 is limited by the shoulder 136 in the closure member 68. On the other hand a leftward movement of the valve plunger 81 also moves the collar 132 leftwardly by the engagement of the head or snap ring 137 connected rigidly to the portion 133 of the plunger 81.

As shown in Figure 4, the valve plunger 81 is in a neutral position. If the plunger 81 is moved leftwardly the collar 131 remains engaged with the shoulder 135 while the collar 132 is moved leftwardly in the bore 134 with the plunger 81 by engagement with the head or snap ring 137 thereby further compressing the spring 130. On the other hand, if the plunger 81 is moved rightwardly, the land 89 thereof engages the collar 131 for slidable movement in the bore 134 while the collar 132 is in abutting relation with the shoulder 136 thereby further compressing the spring 130. From the foregoing, it can be seen that the centering device urges the plunger 81 toward the neutral position as illustrated in Figure 4.

Now in order to actuate movement of the valve plunger 81 from a neutral position to an operating position, the control valve 65 is provided with a servo-motor. This servo-motor may conveniently be comprised of a one-way acting left cylinder, generally indicated at 138 and a one-way acting right cylinder, generally indicated at 139. The piston 140 of the cylinder 138 may be an integral part of the plunger 81 or may be a separate element slidable in the bore 141 in the casing 66 in abutting relation with the plunger 81 as shown in Figure 4. Similarly the piston 142 of the cylinder 139 may be an integral part of the plunger 81 or may be a separate element slidable in the bore 143 in the closure member 68 in abutting relation with the plunger 81. From this it can be seen that if the small chamber 144 is pressurized by fluid under pressure entering through at least one of the conduits 145, 146 and 147, the piston 140 urges movement of the valve plunger 81 in a rightward direction from neutral position to an operating position. It should be noted that in order for the valve plunger 81 to move rightwardly, the chamber 144 must necessarily be energized with sufficient fluid pressure so that the piston 140 overcomes the force exerted by the centering device 129. Likewise, it may also be seen that if the small chamber 148 is pressurized by fluid under pressure entering through at least one of the conduits 149, 150 and 151 the piston 142 urges movement of the valve plunger 81 in a leftward direction from neutral position to an operating position. Again it should be noted that in order for the valve plunger 81 to move leftwardly, the chamber 148 must necessarily be energized with sufficient fluid pressure so that the piston 142 overcomes the force exerted by the centering device 129.

Now in order to prevent the occurrence of fluid pressure in the left end opening 152 of the bore 69 from inhibiting the movement of the plunger 81, a breather passage 153 is provided in the housing 66 communicatively connecting the opening 152 with the first annular groove 70 which groove is communicatively connected with the discharge port 90. Likewise, the spring chamber or bore 134 is provided with a breather passage 154 communicatively connecting the bore 134 with the conduit 92 which conduit is communicatively connected with the discharge port 90. Thus, there is no fluid pressure differential between the opening 152 and the bore 134.

Figure 5:
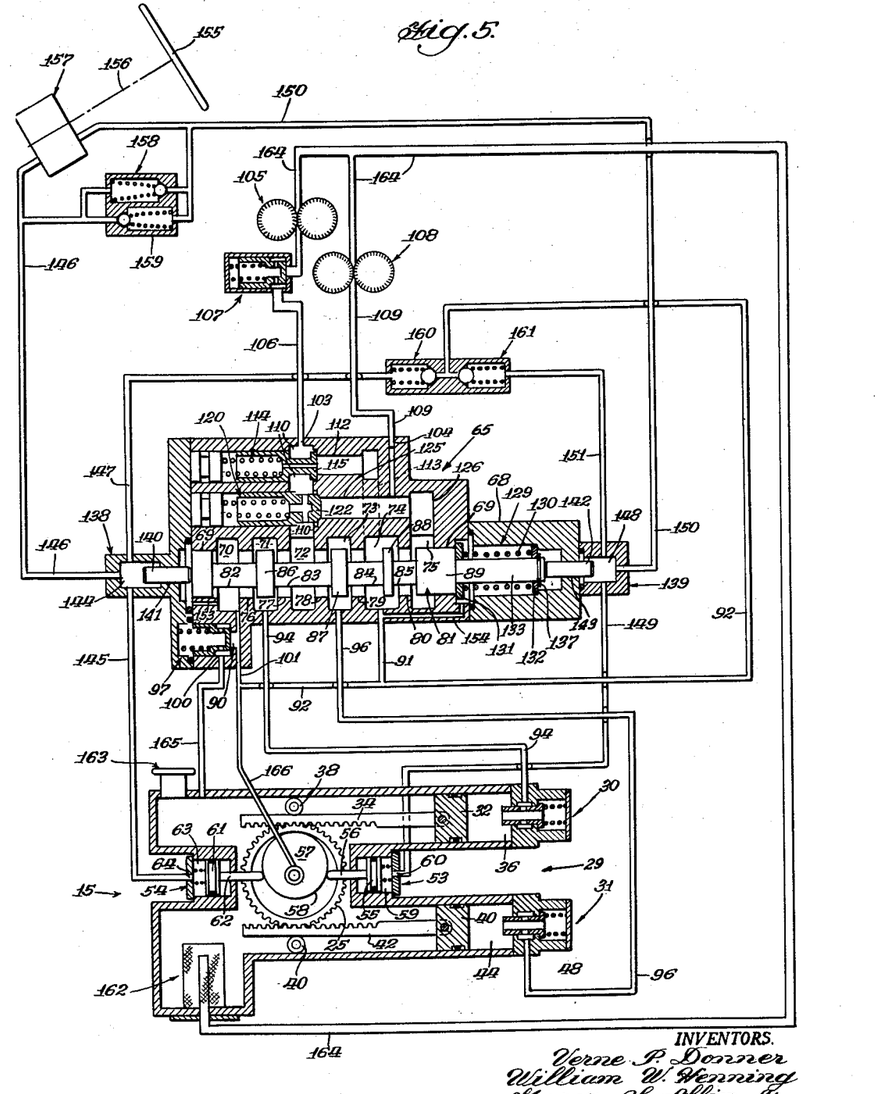
Figure 5 is a schematic drawing illustrating each of the various components including the entire hydraulic control circuit and working circuit comprising a preferred embodiment of this invention.

Figure 5 illustrates in schematic form the hydraulic system of this invention. It will be seen that there are two basic fluid circuits shown, one being the control circuit and the other the working circuit. For convenience the control circuit will be described first.

The numeral 155 is a manually operable steering wheel. The wheel 155 through steering shaft 156 drives rotatably a small positive displacement pump of conventional design indicated at 157. Rotation of the wheel 155 in one direction causes movement of fluid from the conduit 146 to the conduit 150. Conversely, rotation of the wheel 155 in the other direction causes movement of fluid from the conduit 150 to the conduit 146. A pair of oppositely connected small relief valves 158 and 159 may conveniently be provided so that a by-pass condition occurs in the event that fluid pressure in either of the conduits 146 or 150 exceeds a predetermined value.

The conduits 146 and 150 are communicatively connected to the servo-motor comprising the left cylinder 138 and the right cylinder 139 respectively. The conduits 147 and 151 communicatively connected to the cylinders 138 and 139, respectively, terminate at the outlet sides of a pair of small check valves 160 and 161, respectively, as shown in Figure 5. The inlet sides of the check valves 160 and 161 are connected to the discharge port 90 through the conduit 92. Normally there is no movement of fluid through the conduits 147 and 151 or the check valves 160 and 161. The sole purpose of the check valves 160 and 161 is to permit replenishment of fluid in the control circuit from the working circuit in the event that fluid in the control circuit is lost by leakage or otherwise.

The conduit 145 communicatively connects the small chamber 144 of the left cylinder 138 with the port 64 and chamber 63 of the right cylinder of servo-pump 54. Similarly, the conduit 149 communicatively connects the small chamber 148 of the right cylinder 139 with the port 60 and chamber 59 of the left cylinder of servo-pump 53.

From the above it can be seen that the control circuit of this invention includes the displacement pump 157, the left cylinder 138 and right cylinder 139 comprising the servo-motor, the left cylinder servo-pump 53 and right cylinder servo-pump 54, small relief valves 158 and 159 interconnected communicatively through conduits 146, 150, 147, 151, 145 and 149 as shown in Figure 5. The operating characteristics of the control circuit for controllaby shifting the movable valve member 81 of the control valve will be described later in this specification.

The working circuit of this invention will now be described.

The casing 16 of the reversible motor 29 (Figure 3) may for convenience be entirely closed so that it can serve as a reservoir 162 for the primary source of fluid under pressure 105 and the secondary source of fluid under pressure 108. Thus, the fluid reservoir is designated by the numeral 162 which reservoir may be suitably vented as schematically indicated at 163 in Figure 5. The reservoir 162 is communicatively connected to the inlet sides of the sources of fluid pressure 105 and 108 by the conduit 164. The outlet side of the primary fluid pressure source 105 is communicatively connected to the primary inlet port 103 of the control valve 65 through the conduit 106. It will be noted that reverse flow of fluid through conduit 106 is prevented by the unidirectional flow valve 107 interposed therein. The outlet side of the secondary fluid pressure source 108 is communicatively connected to the secondary inlet port 104 of the control valve 65 through the conduit 109. The conduit 94 communicatively connects the second annular groove 71 through the first outlet port 93 of the control valve 65 with the chamber 36 of the first ram 30. Similarly, the conduit 96 communicatively connects the fourth annular groove 73 through the second outlet port 95 of the control valve 65 with the chamber 44 of the second ram 31. The conduit 92 communicatively connects the fifth annular groove 74 through the port 91 and conduit 101 with the discharge port 90. Also the conduit 92 communicatively connects the inlet sides of the small check valves 160 and 161 with the discharge port 90 through the conduit 101. The outlet side 100 of the check valve 97 is communicatively connected to the sump or reservoir 162 through the conduit 165.

The conduit 166 is merely a bleeder line communicatively connected to the conduit 101 for conveniently lubricating the bearing members of the pivotal connection 15 and forms no part of this invention.

Having now described the construction of this invention the operation of the system will now be described.

Operation

The steering system of this invention as illustrated in the drawings is in a condition for a straight course of travel of the tractor 10 and its associated trailer 13. Thus, the control valve 65 is in neutral position as shown in Figures 4 and 5 and the pistons 32 and 40 of the rams 30 and 31, respectively, are in medial position as illustrated in Figures 2 and 5.

Referring to Figure 5 the control circuit which basically comprises the displacement pump 157, small relief valves 158 and 159, left cylinder 138 and right cylinder 139 (servo-motor), left cylinder servo-pump 53 and right cylinder servo-pump 54, interconnected together by the conduits 145, 146, 147, 149, 150 and 151 are in a static condition whereby the movable valve element 81 of the control valve 65 is in neutral position. It will be noted that the control circuit is a closed fluid circuit independent of the primary source of fluid under pressure 105 and secondary source of fluid under pressure 108. It will also be noted that the position of the cam 57 (Figure 5) maintains pistons 55 and 61 in medial position indicating that the course of travel of the tractor 10 and trailer 13 is in a straight line. The flow of fluid through the working circuit when the control valve 65 is in neutral position will now be described.

With continued reference to Figure 5, fluid under pressure from the primary pump 105 flows through the unidirectional flow valve 107 to the primary inlet port 103 of the control valve 65 through the conduit 106. From the port 103 the fluid passes into the third annular groove 72 through the elongated compartment 110. Since the movable valve member 81 is in neutral position, none of the lands 86, 87, 88 and 89 register with lands 76, 77, 78, 79 and 80 so fluid entering the third annular groove 72 may communicate with the first annular groove 70, second annular groove 71, fourth annular groove 73, fifth annular groove 74 and sixth annular groove 75. However, the only outlet for the fluid is by way of the first annular groove 70 in communication with the discharge port 90 and the fifth annular groove 74 in communication with the discharge port 90 through port 91 and conduits 92 and 101. The discharge port 90 may also be considered the inlet side of check valve 97. The valve 97 is adjusted to open at a low value predetermined fluid pressure, for example 25 p.s.i., so that the fluid by-passes therethrough to the sump or reservoir 162 through the conduit 165. Thus, when the control valve 65 is in neutral position as shown in Figures 4 and 5, the fluid pressure within the bore 69 is maintained at a value not exceeding the value set by the check valve 97. From this it can be seen that both the first ram 30 and second ram 31 are energized at low pressure from fluid in the second annular groove 71 communicatively connected to the first ram 30 through the conduit 94 and the fourth annular groove 73 communicatively connected to the second ram 31 through the conduit 96. Since both rams 30 and 31 are energized equally the pistons 32 and 40 of the rams 30 and 31 respectively being opposed to each other will not move. The force exerted by the pistons 32 and 40 maintain the teeth 35 of the rack member 34 and teeth 43 of the rack member 42 in constant force of low magnitude with the teeth of the pinion gear 25 thus eliminating backlash without appreciable wear on the teeth. This anti-backlash feature provides noiseless operation and eliminates damage to the teeth through pounding during the operation thereof. It will be noted that this anti-backlash feature is present during all operational movements of the steering mechanism as will be evident in the further discussion. It should now be clear that when the control valve 65 is in neutral position, fluid from the pump 105 is effectively bypassed back to the reservoir 162.

The fluid from the secondary source of fluid under pressure 108 enters the control valve 65 at the secondary inlet port 104 through the conduit 109. From the port 104 the fluid passes into the sixth annular groove 75 through the bore 125 and passage 126. Since the movable valve member 81 of the control valve 65 is in neutral position, the fluid under pressure from the secondary source 108 merges with the fluid from the primary source 105 and is by-passed back to the reservoir 162 in the same manner as that described for the primary source 105. It will be noted that the relief valves 114 and 120 remain in closed or seated position.

Now suppose the operator rotates the steering wheel 155 in one direction as in a normal steering movement. The displacement pump 157 causes a pressure rise in the conduit 146 of the control circuit above that in the conduit 150. Since the fluid in the conduits 145, 147, 149 and 151 is normally static, there is a pressure differential created whereby the pressure in the small chamber 144 of the left cylinder 138 is greater than the pressure in the small chamber 148 of the right cylinder 139. When the aforementioned pressure differential is great enough to overcome the action of the centering device 129, the piston 140 moves the plunger 81 of the control valve 65 rightwardly to a first forward position. When the first forward position of the plunger 81 is reached the land 86 has moved sufficiently to register with land 77 thereby terminating fluid communication from the third annular groove 72 to the second annular grove 71. Simultaneously, the land 87 has moved sufficiently to register with land 79 thereby terminating flow of fluid between the fourth annular groove 73 and the fifth annular groove 74. Meanwhile, the land 88 has not moved sufficiently to register with land 80 thereby permitting the fluid from the secondary source of fluid under pressure 108 to continue to be by-passed in the same manner as that for neutral position as previously explained.

With the plunger 81 in the first forward position only the fluid under pressure from the primary pump 105 is utilized for steering. The fluid from the pump 105 enters the primary inlet port 103 of the control valve 65 and passes into the third annular groove 72 through the compartment 110. From the third annular groove 72 the fluid passes into the fourth annular groove 73 and into the chamber 44 through the conduit 96 thus energizing the second ram 31 at high pressure. The ram 31, therefore, expands to move the pinion gear 25 relatively clockwise. Meanwhile, the first ram 30 is caused to retract by movement of the pinion 25, rack member 34 and piston 32. The fluid in the chamber 36 of the ram 30 exhausts into the second annular groove 71 through the conduit 94. From the second annular groove 71 the fluid passes into the first annular groove 70 which groove is in communication with the discharge port 90. From the discharge port 90 the fluid passes through the check valve 97 in the manner described previously to the reservoir 162 through the conduit 165.

In the event that the operator continues a normal steering movement in the same direction until a maximum angular displacement between the tractor 10 and trailer 13 is reached, the piston 40 of the ram 31 will have reached its maximum expansible limit. When this condition is reached, no further flow of fluid is possible in the conduit 96. Thus, a further pressure increase may immediately occur in the third annular groove 72 and compartment 110. Under such conditions when the pressure reaches a predetermined limit, the relief valve 114 opens to relieve the excess fluid under pressure in the compartment 110 to bleed into the bore 112 through the passage 113 to the fifth annular groove 74 where it merges with the fluid from the secondary source of fluid under pressure 108 and is by-passed back to the reservoir 162 through the port 91, conduits 92 and 101, discharge port 90, check valve 97 and conduit 165. Thus, damage of the apparatus by excessive pressure is avoided.

Now further suppose that the operator finds that the normal steering movement response is insufficient to meet his needs at a given particular time owing to the limited delivery capacity of the pump 105. He then applies a greater effort in rotating the steering wheel 155 which through the resulting action of the displacement pump 157 creates a greater increase in pressure in the conduit 146 over that in the conduit 150. This movement causes a greater pressure in the control circuit which further increases the pressure in the small chamber 144 of the left cylinder 138. Thus, the piston 140 drives the plunger 81 of the control valve 65 rightwardly beyond the first forward position above described to a second forward position now to be described. At this point it should be noted that when the plunger 81 is moved rightwardly to the second forward position fluid under pressure from both sources 105 and 108 are combinedly employed in effecting steering movement of the tractor 10 and trailer 13.

When the plunger 81 is moved to its extreme rightward limit (second forward position) the land 86 is in registration with land 77 thereby preventing fluid communication from the third annular groove 72 to the second annular groove 71. The land 87 also is in registration with the land 79 thereby preventing flow of fluid between the fourth annular groove 73 and fifth annular groove 74. However, when the plunger 81 is moved to its extreme rightward position (second forward position), the land 88 registers with the land 80 thus terminating flow of fluid from the sixth annular groove 75 to the fifth annular groove 74. From this it can be seen that since fluid flow in the passage 126 and sixth annular groove 75 is terminated, fluid pressure in the bore 125 will immediately rise which pressure rise unseats the second relief valve 120 thereby merging flow of fluid from the secondary pump 108 with the fluid from the primary pump 105 in the compartment 110. Thus, fluid under pressure from both sources passes into the third annular groove 72 thence to the ram 31 through the conduit 96. As in the case of the first forward position of the plunger 81, the expanding ram 31 causes retraction of the ram 30 and the exhausting of fluid from the chamber 36 is the same as that described for the first forward position.

Assuming again that the tractor 10 and trailer 13 are aligned for a straight course of travel and the operator wishes to effect a normal steering turn in the other direction. He rotates the steering wheel 155 in the other direction in a normal steering movement. The displacement pump 157 now operates reversely from that previously described and causes a pressure rise in the conduit 150 of the control circuit above that in the conduit 146. Since, as before, the fluid in the conduits 145, 147, 149 and 151 is static, there is a pressure differential created whereby the pressure in the small chamber 148 of the right cylinder 139 is greater than the pressure in the small chamber 144 of the left cylinder 138. Again, as before, when the pressure differential is great enough to overcome the action of the centering device 129, the piston 142 moves the plunger 81 of the control valve 65 leftwardly from neutral position to a first reverse position. When the first reverse position is reached, the land 86 has moved sufficiently to register with land 76 thereby terminating fluid communication from the second annular groove 71 to the first annular groove 70. Simultaneously, the land 87 has moved sufficiently to register with the land 78 thereby terminating flow of fluid between the fourth annular groove 73 and the third annular groove 72, Meanwhile, the land 89 has not moved sufficiently to register with land 80 thereby permitting the fluid from the secondary source of fluid under pressure 108 to continue to be bypassed in the same manner as that for neutral position as previously explained.

With the plunger 81 in the first reverse position only the fluid under pressure from the primary pump 105 is utilized for steering. The fluid from the pump 105 enters the primary inlet port 103 of the control valve 65 and passes into the third annular groove 72 through the compartment 110. From the third annular groove 72 the fluid passes into the second annular groove 71 and into the chamber 36 through the conduit 94 thus energizing the first ram 30 at high pressure. The ram 30 therefore expands to move the pinion gear 25 relatively counter-clockwise. Meanwhile, the second ram 31 is caused to retract by movement of the pinion 25, rack member 42 and piston 40. The fluid in the chamber 44 of the ram 31 exhausts into the fourth annular groove 73 through the conduit 96. From the fourth annular groove 73 the fluid passes into the fifth annular groove 74 which groove is in communication with the discharge port 90 through port 91 and conduits 92 and 101. From the discharge port 90 the fluid passes through the check valve 97 in the manner described previously to the reservoir 162 through the conduit 165.

Now again supposing that the operator finds that the normal steering movement response is insufficient to meet his needs at a given particular time owing to the limited delivery capacity of the pump 105. He then applies a greater effort in rotating the steering wheel 155 in the same direction which through the resulting action of the displacement pump creates a greater increase in pressure in the conduit 150 over that in the conduit 146. This movement causes a greater pressure in the control circuit which further increases the pressure in the small chamber 148 of the right cylinder 139. Thus, the piston 142 drives the plunger 81 of the control valve 65 leftwardly beyond the first reverse position above described to a second reverse position now to be described. It should be noted when the plunger is moved leftwardly to the second reverse position, fluid under pressure from both sources 105 and 108 are combinedly employed in effecting steering movement of the tractor 10 and trailer 13.

When the plunger 81 is moved to its extreme leftward limit (second reverse position), the land 86 is in registration with land 76 thereby preventing fluid communication from the second annular groove 71 to the first annular groove 70. The land 87 also is in registration with the land 78 thereby preventing flow of fluid between the fourth annular groove 73 and the third annular groove 72. However, when the plunger 81 is moved to its extreme leftward position (second reverse position), the land 89 registers with the land 80 thus terminating flow of fluid from the sixth annular groove 75 to the fifth annular groove 74. From this it can be seen that since fluid flow in the passage 126 and sixth annular groove 75 is terminated, fluid pressure in the bore 125 will immediately rise which pressure rise unseats the second relief valve 120 thereby merging flow of fluid from the secondary pump 108 with the fluid from the primary pump 105 in the compartment 110. Thus, fluid under pressure from both sources passes into the third annular groove 72 thence to the ram 30 through the conduit 94 and second annular groove 71. As in the case of the first reverse position of the plunger 81, the expanding ram 30 causes retraction of the ram 31 and the exhausting of fluid from the chamber 44 is the same as that described for the first reverse position.

Up to this point, means have been described whereby the operator, by manipulating manually the steering wheel 155 appropriately, may shift the plunger 81 of the control valve 65 into any one of five positions, namely, neutral position, first and second forward positions and first and second reverse positions. In order that the operator may have the benefit of "road feel" in the steering operation, a means for follow-up or progressive steering in this invention will now be described.

The follow-up means employed in the control circuit is essentially of the telemeter type system whereby means are provided for progressively equalizing the fluid pressure in the left cylinder 138 with that of the right cylinder chamber 139 of the servo-motor so that as the tractor 10 reaches a predetermined angular displacement with respect to the trailer 13, the plunger 81 of the control valve 65 is progressively moved to neutral position independently of the steering wheel 155 and associated displacement pump 157.

Suppose, for example, the operator desires to alter the course of travel from a straight line to an arcuate path in one direction in an ordinary normal steering movement. In order to accomplish an arcuate path of travel it is necessary that the tractor 10 be angularly displaced with respect to the trailer 13. The operator rotates the steering wheel 155 to a predetermined position and manually maintains the wheel 155 fixedly in the assumed position. As previously described, this normal steering movement creates a pressure differential in the control circuit whereby the left cylinder 138 of the servo-motor actuates the plunger 81 in a rightward direction from neutral position to the first forward position (or to the second forward position depending upon the extent and rate of rotation the operator imparts to the steering wheel 155). Immediately the ram 31 is energized and commences to expand while the ram 30 concurrently commences to retract further from the position illustrated in Figure 5. Simultaneously, the pinion gear 25 begins to rotate clockwise which movement imparts an angular displacement between the tractor 10 and trailer 13. At the same time, the cam surface 48 of the cam 57 mounted on the pinion gear 25 begins to rotate clockwise respective to the servo-pump 53 and servo-pump 54. The servo-pump 53 is caused to further retract by the action of the cam surface 58 on the actuating pin 56. Thus, the piston 55 forces fluid in the chamber 59 into the conduit 149 which communicates with the small chamber 148 of the cylinder 139 thereby gradually elevating the fluid pressure in the small chamber 148. Simultaneously, the servo-motor 54 is permitted to expand from the position shown in Figure 5 by the action of the actuating pin 62 on the cam surface 58 of the rotating cam 57. Thus, the chamber 63 increases in volume admitting additional fluid therein from the small chamber 144 of the cylinder 138 communicatively connected through the conduit 145. The decrease in fluid pressure in the small chamber 144 with a corresponding increase in fluid pressure in the small chamber 148 is thus progressive in character as the pinion gear 25 rotates until the pressure in the two chambers 144 and 148 approach equal value. As the pressure differential in the two chambers 144 and 148 decreases the valve plunger 81 of the control valve 65 progressively moves toward neutral position assisted by the centering device 129. When the plunger 81 reaches neutral, by-pass of fluid from the pumps 105 and 108 is again re-established and the ram 31 is no longer energized which halts any further rotation of the pinion 25. Thus, the tractor 10 has assumed an angular displacement with respect to the trailer 13 and will remain at such angular displacement until the operator again rotates the steering wheel 155. Obviously, steering in the other direction will produce corresponding results in the other direction.

It should be understood that the volumetric displacements of the servo-pumps 53 and 54 and the servo-motor 138 and 139 must be selected appropriately with reference to the displacement pump 157 so that incremental rotation of the steering wheel 155 will produce a corresponding angular displacement of the tractor 10 with respect to its trailer 13.

It should be noted that particularly when the tractor 10 and its trailer 13 are travelling over rough or uneven terrain, any force imparted to one with reference to the other which force tends to alter the angular displacement between the two is immediately transmitted to the servo-pumps 53 and 54 which will move the plunger 81 from the neutral position to an operating position to counteract such force in the direction necessary to correct the alteration in angular displacement. Such force also affects fluid pressure in the conduits 146 and 150 which acting through the displacement pump 157 reflects back to the operator at the steering wheel 155. Thus, the operator has the benefit of road feel similar as that in steering an automobile for example.

Having thus described an embodiment of the invention, it can now be seen that the objects of the invention have been fully achieved and it must be understood that changes and modifications may be made which do not depart from the spirit of the invention nor upon the scope thereof as defined in the appended claims.

What is claimed is:

1. A fluid power steering system for a two-wheel tractor vehicle pivotally connected to a trailer vehicle comprising a pinion gear rigidly connected in operative position to one of said vehicles at said pivotal connection, an hydraulic working circuit and an hydraulic control circuit, said working circuit having a primary source of fluid under pressure and a secondary source of fluid under pressure including fluid return means, a control valve having a primary inlet port communicatively connected to said primary source of fluid pressure and a secondary inlet port communicatively connected to said secondary source of fluid under pressure, a first single-acting hydraulic ram mounted on the other of said vehicles and having a first rack member operably connected in meshed relation with said pinion gear for actuating steering in one direction, a first fluid outlet port in said control valve communicatively connected to said first ram, a second single-acting hydraulic ram mounted on the other of said vehicles and having a second rack member operably connected in meshed relation with said pinion gear for actuating steering in the other direction, a second fluid outlet port in said control valve communicatively connected to said second ram, a discharge port disposed in said control valve, a check valve having its inlet side communicatively connected with said discharge port and its outlet side communicatively connected to said fluid return means, said check valve serving to by-pass fluid from said discharge port to said fluid return means when fluid pressure in said discharge port exceeds a predetermined low value, a second check valve having its inlet side communicatively connected to said secondary inlet port of said control valve and its outlet side communicatively connected to said primary inlet port of said control valve, a movable valve member disposed in said control valve, said member being movable from a neutral position to a first forward position for communicatively connecting said primary source of fluid under pressure with said first ram for actuating steering in one direction, said member being movable from said first forward position to a second forward position for communicatively connecting said primary and secondary sources of fluid under pressure with said first ram for actuating steering in said one direction, said member being movable from said neutral positon to a first reverse position for communicatively connecting said primary source of fluid under pressure with said second ram for actuating steering in the other direction, said member being movable from said first reverse position to a second reverse position for communicatively connecting said primary and secondary sources of fluid under pressure with said second ram for actuating steering in said other direction, said control valve being adapted to connect communicatively said rams and said sources of fluid under pressure with said discharge port when said control valve is in neutral position, and a servo-motor connected to actuate said movable member responsive to fluid pressure in said hydraulic control circuit.

2. A fluid power steering system for a two-wheel tractor vehicle pivotally connected to a trailer vehicle comprising a pinion gear connected in operative position to one of said vehicles at said pivotal connection, an hydraulic working circuit and an hydraulic control circuit, said working circuit having a primary source of fluid under pressure and a secondary source of fluid under pressure including fluid return means, a control valve having a primary inlet port communicatively connected to said primary source of fluid under pressure and a secondary inlet port communicatively connected to said secondary source of fluid under pressure, a first single-acting hydraulic ram mounted on the other of said vehicles and having a first rack member operably connected in meshed relation with said pinion gear for actuating steering in one direction, a first fluid outlet port in said control valve communicatively connected to said first ram, a second single-acting hydraulic ram mounted on the other of said vehicles and having a second rack member operably connected in meshed relation with said pinion gear for actuating steering in the other direction, a second fluid outlet port in said control valve communicatively connected to said second ram, a discharge port disposed in said control valve, a check valve having its inlet side communicatively connected with said discharge port and its outlet side communicatively connected to said fluid return means, said check valve serving to by-pass fluid from said discharge port to said fluid return means when fluid pressure in said discharge port exceeds a predetermined low value, a movable valve member disposed in said control valve, said member being movable from a neutral position to a first forward position for communicatively connecting said primary source of fluid under pressure with said first ram for actuating steering in said one direction, said member being movable from said first forward position to a second forward position for communicatively connecting said primary and secondary sources of fluid under pressure with said first ram for actuating steering in said one direction, said member being movable from said neutral position to a first reverse position for communicatively connecting said primary source of fluid under pressure with said second ram for actuating steering in the other direction, said member being movable from said first reverse position to a second reverse position for communicatively connecting said primary and secondary sources of fluid under pressure with said second ram for actuating steering in said other direction, said control valve being adapted to connect communicatively said rams and said sources of fluid under pressure with said discharge port when said control valve is in neutral position, a servo-motor connected to actuate said movable member of said control valve, said control circuit having manually operable means for moving fluid in at least one direction in said control circuit, said servo-motor being operatively responsive to movement of fluid in said control circuit for actuating said movable member of said control valve, and means for reversing said movement of fluid in said control circuit for returning said movable member from an operating position to neutral position when one of said rams has been actuated to a predetermined adjustable limit.

3. A fluid power steering system for a two-wheel tractor vehicle pivotally connected to a trailer vehicle comprising a pinion gear rigidly connected in operative position to one of said vehicles at said pivotal connection, an hydraulic working circuit and an hydraulic control circuit, said working circuit having a primary source of fluid under pressure and a secondary source of fluid under pressure including fluid return means, a control valve having a primary inlet port communicatively connected to said primary source of fluid under pressure and a secondary inlet port communicatively connected to said secondary source of fluid under pressure, a first single-acting hydraulic ram mounted on the other of said vehicles and having a first rack member operably connected in meshed relation with said pinion gear for actuating steering in one direction, a first fluid outlet port in said control valve communicatively connected to said first ram, a second single-acting hydraulic ram mounted on the other of said vehicles and having a second rack member operably connected in meshed relation with said pinion gear for actuating steering in the other direction, a second fluid outlet port in said control valve communicatively connected to said second ram, a discharge port disposed in said control valve, a check valve having its inlet side communicatively connected with said discharge port and its outlet side communicatively connected to said fluid return means, said check valve serving to by-pass fluid from said discharge port to said fluid return means when fluid pressure in said discharge port exceeds a predetermined low value, a movable valve member disposed in said control valve, said member being movable from a neutral position to a first forward position for communicatively connecting said primary source of fluid under pressure with said first ram for actuating steering in one direction, said member being movable from said first forward position to a second forward position for communicatively connecting said primary and secondary sources of fluid under pressure with said first ram for actuating steering in said one direction, said member being movable from said neutral position to a first reverse position for communicatively connecting said primary source of fluid under pressure with said second ram for actuating steering in the other direction, said member being movable from said first reverse position to a second reverse position for communicatively connecting said primary and secondary sources of fluid under pressure with said second ram for actuating steering in said other direction, said control valve being adapted to connect communicatively said rams and said sources of fluid under pressure with said discharge port when said control valve is in neutral position, a servo-motor connected to actuate said movable member of said control valve, said control circuit having manually operable means for moving fluid in at least one direction in said control circuit, said servo-motor being operatively responsive to movement of fluid in said control circuit for actuating said movable member of said control valve, and means for reversing said movement of fluid in said control circuit for returning said movable member from an operating position to neutral position when one of said rams has been actuated to a predetermined adjustable limit.

4. In a steering mechanism for a two-wheel tractor vehicle pivotally connected to a trailer vehicle an hydraulic system comprising a pinion gear rigidly connected in operative position to one of said vehicles at said pivotal connection, an hydraulic working circuit and an hydraulic control circuit, a primary source of fluid under pressure including fluid return means and a secondary source of fluid under pressure including fluid return means, a control valve, said control valve having a primary inlet port communicatively connected to said primary source of fluid under pressure, said control valve having a secondary inlet port communicatively connected to said secondary source of fluid under pressure, a first single-acting hydraulic ram mounted on the other of said vehicles and having a first rack member operably connected in meshed relation with said pinion gear to said mechanism for actuating steering in one direction, a second single-acting hydraulic ram mounted on the other of said vehicles and having a second rack member operably connected in meshed relation with said pinion gear to said mechanism for actuating steering in the other direction, said control valve having a first outlet port communicatively connected to said first ram, said control valve having a second outlet port communicatively connected to said second ram, a discharge port disposed in said control valve, a check valve having its inlet side communicatively connected to said discharge port and its outlet side communicatively connected to at least one of said fluid return means, a second check valve having its inlet side communicatively connected to said secondary inlet port of said control valve and its outlet side communicatively connected to said primary inlet port of said control valve, a valve plunger slidably disposed in said control valve, said valve plunger being adapted to communicatively connect said primary and secondary inlet ports with said discharge port and said outlet ports thereby by-passing said fluid under pressure from said primary and secondary sources when said control valve is in a neutral position, and said valve plunger being adapted to connect communicatively at least one of said sources of fluid under pressure alternately with one of said rams when said control valve is in an operating position.

5. A fluid power steering system for a two-wheel tractor vehicle pivotally connected to a trailer vehicle comprising a pinion gear rigidly connected in operative position to said trailer vehicle at said pivotal connection, an hydraulic working circuit and an hydraulic control circuit, said working circuit having a primary source of fluid under pressure and a secondary source of fluid under pressure including fluid return means, a control valve having a primary inlet port communicatively connected to said primary source of fluid under pressure and a secondary inlet port communicatively connected to said secondary source of fluid under pressure, a first single-acting hydraulic ram mounted on said tractor vehicle and having a first rack member operably connected in meshed relation with said pinion gear for actuating steering in one direction, a first fluid outlet port in said control valve communicatively connected to said first ram, a second single-acting hydraulic ram mounted on said tractor vehicle and having a second rack member operably connected in meshed relation with said pinion gear for actuating steering in the other direction, a second fluid outlet port in said control valve communicatively connected to said second ram, a discharge port disposed in said control valve, a check valve having its inlet side communicatively connected with said discharge port and its outlet side communicatively connected to said fluid return means, said check valve serving to by-pass fluid from said discharge port to said fluid return means when fluid pressure in said discharge port exceeds a predetermined low value, a movable valve member disposed in said control valve, said member being movable from a neutral position to a first forward position for communicatively connecting said primary source of fluid under pressure with said first ram for actuating steering in one direction, said member being movable from said first forward position to a second forward position for communicatively connecting said primary and secondary sources of fluid under pressure with said first ram for actuating steering in said one direction, said member being movable from said neutral position to a first reverse position for communicatively connecting said primary source of fluid under pressure with said second ram for actuating steering in the other direction, said member being movable from said first reverse position to a second reverse position for communicatively connecting said primary and secondary sources of fluid under pressure with said second ram for actuating steering in said other direction, said control valve being adapted to connect communicatively said rams and said sources of fluid under pressure with said discharge port when said control valve is in neutral position, a servo-motor connected to actuate said movable member of said control valve, said control circuit having manually operable means for moving fluid in at least one direction in said control circuit, said servo-motor being operatively responsive to movement of fluid in said control circuit for actuating said movable member of said control valve, a servo-pump disposed in said steering system and communicatively connected to said control circuit, said pump being operatively responsive to steering movement whereby fluid in said control circuit is moved in a direction to actuate said servo-motor for returning said movable member of said control from an operating position to neutral position.

References Cited in the file of this patent

UNITED STATES PATENTS

| | | |
|---|---|---|
| 1,454,396 | MacDonald | May 8, 1923 |
| 2,521,652 | Rockwell | Sept. 5, 1950 |
| 2,532,786 | Richter | Dec. 5, 1950 |
| 2,583,197 | Armington | Jan. 22, 1952 |
| 2,614,644 | Gustafson | Oct. 21, 1952 |